United States Patent [19]
Margolin et al.

[11] Patent Number: 4,715,251
[45] Date of Patent: Dec. 29, 1987

[54] FIBER OPTIC CABLE PREPARATION TOOL AND METHOD OF PREPARING FIBER OPTIC CABLE FOR TERMINATION WITH A FIBER OPTIC CONNECTOR

[75] Inventors: Mark Margolin; Igor Grois, both of Lincolnwood; James E. Moore, Wheaton, all of Ill.

[73] Assignee: Amphenol Corporation, Wallingford, Conn.

[21] Appl. No.: 892,986

[22] Filed: Aug. 4, 1986

[51] Int. Cl.⁴ ............................................... H02G 1/12
[52] U.S. Cl. ........................................... 81/9.4; 29/854
[58] Field of Search ..................... 81/9.4; 29/828, 854, 29/747, 748; 30/90.1

[56] References Cited

U.S. PATENT DOCUMENTS 4,345,370 8/1982 Cartier et al. ........................ 29/854
4,459,746 7/1984 Goodman ........................... 30/90.1

FOREIGN PATENT DOCUMENTS 3406915 9/1985 Fed. Rep. of Germany ......... 81/9.4

Primary Examiner—Roscoe V. Parker
Attorney, Agent, or Firm—Bacon & Thomas

[57] ABSTRACT

A tool for preparing a fiber optic cable for termination with a fiber optic connector. The cable is of the type having a concentric arrangement, from the exterior of the center thereof, an outer protective cover, a layer of strength members and a buffer layered cover fiber. A longitudinally extending first member of the tool includes a longitudinal passage extending therethrough and the cable is mountable therein with a predetermined length extending from the front thereof. The front of the member is a frusto-conical shape on the exterior thereof and the cable is clamped within the member. A second clamp member also having a longitudinal passage therethrough is of a size such that the second clamp member can be received on the exterior of the frusto-conical end of the first member such as to hold strength members of the fiber optic cable securely against the outer surface of the frusto-conical end when the strength members are folded thereover. A sleeve press member then serves to force an inner sleeve which is mounted over the buffer covered end of the fiber into the region between the strength members and the buffered sleeve. The sleeve press member is of a predetermined length such that when engaged against the front end of the two previously described members, defines the length of fiber of the cable to be left with the buffer layer thereon so that the remaining fiber extending therefrom can have the buffer layer stripped. The disclosure also relates to a method of using the tool to prepare a fiber optic cable.

7 Claims, 4 Drawing Figures

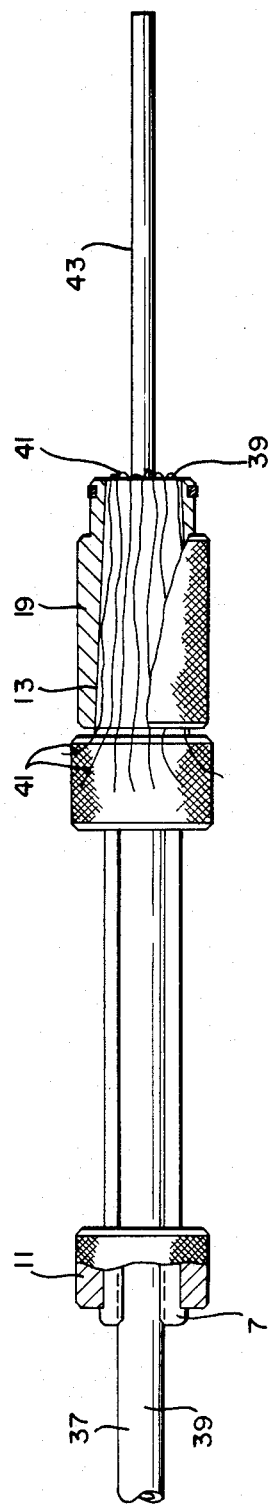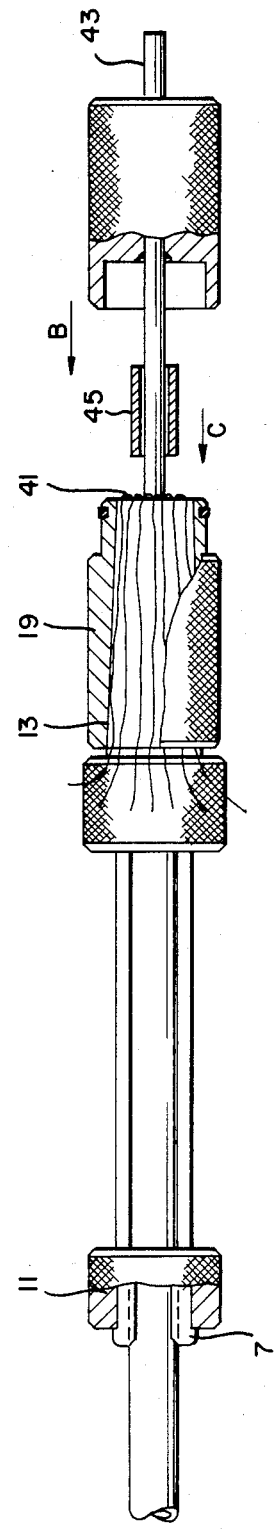

FIBER OPTIC CABLE PREPARATION TOOL AND METHOD OF PREPARING FIBER OPTIC CABLE FOR TERMINATION WITH A FIBER OPTIC CONNECTOR

BACKGROUND OF THE INVENTION

This invention relates to a tool for use in preparing a fiber optic cable for termination with a fiber optic connector. The invention also relates to the method of preparing the fiber optic cable to permit simple and easy termination with a fiber optic connector.

A typical fiber optic cable generally consists of a centrally located optical fiber which is covered by a buffer layer, typically of silicone or some other like material. This buffered fiber is in turn covered by a layer of high tensile strength fibers which serve to protect the optical fiber. Typically these high tensile strength fibers are those commerically available under the trade name Kevlar TM. The strength fiber covered optical fiber is in turn surrounded by a plastic jacket.

In order to terminate the fiber optic cable with a fiber optic connector it is necessary to strip the jacket to a specific length to expose the strength fibers and the buffered fiber. The buffered fiber is stripped of buffer material to accomodate attachment of the optical fiber to the mating end of the connector. Furthermore, the strength fibers are prepared for attachment in a crimping arrangement to structural parts of the connector. As can be appreciated this involves the use of many tools and many steps resulting in a considerable waste of time and motion on the part of the worker.

In one specific arrangement such as disclosed in U.S. application Ser. No. 766,743 filed Aug. 16, 1985, and which disclosure is specifically incorporated by reference herein, a fiber optic cable is connected to the rear end of a fiber optic connector by inserting a metal sleeve as a support or base for a terminated portion of the strength layer and outer sheath. The metal sleeve is received between the buffer covered fiber and the strength layer with the cable then being inserted into the connector and an outer crimp sleeve being crimped onto the outer sheath of the cable thereby holding the outer sheath and strength layers between the metal sleeve support and the outer crimp sleeve. In preparing a cable for this particular type of arrangement, this becomes a rather tedious and difficult operation because generally the strength layer and the buffer layer are in very tight engagement and thus, insertion of the inner sleeve becomes difficult. Moreover, there is no precise way to ensure uniformity of distribution of the strength layer fibers about the inner sleeve and thus, often times when attached to a connector, the cable is not securely attached due to the fact that there are no strength layers located at one or another portion of the outer surface of the inner sleeve for crimping against the inner sleeve.

In the practice of the present invention, the above-identified problems are overcome by providing a tool which simplifies the preparation operation in a foolproof manner and further ensures that the preparation of the cable is always done on a repeatable basis. Accordingly, by the use of such a tool a method of preparing such a fiber optic cable is also provided.

SUMMARY OF THE INVENTION

In accordance with the invention a tool for preparing a fiber optic cable for termination with a fiber optic connector is provided. The fiber optic cable is a cable of the type having, in a concentric arrangement, from the exterior to the center thereof, an outer protective cover, a layer of strength members and a buffer layer covered fiber. The tool comprises an elongate first member which has a longitudinal passage extending therethrough. The member has one end which is of clampable construction and another end whose exterior surface is of frusto-conical shape. Clamp means are provided for clamping the one end of the first member onto a fiber optic cable to be received within the longitudinal passage thereof and held by said first member. A second clamp member having a longitudinal passage therethrough is provided and is of such a size that the second clamp member can be received on the exterior of the frusto-conical end of the first member in a manner for holding strength members of a fiber optic cable securely against the outer surface of the frusto-conical end of the first member. Sleeve press means cooperates with the above described elements and includes a longitudinal passage extending therethrough of a size sufficient to permit a buffer covered fiber of a fiber optic cable to pass therethrough. A recess is provided at one end of the sleeve press means, which recess is of predetermined depth for receiving the above discussed inner crimp sleeve, which is mounted surrounding the buffered cover optical fiber, in abutment against the one end of the sleeve press means in the recess in a manner such that the inner crimp sleeve can be forced into the cable between strength layer and the buffer layer to provide a support for an outer crimp sleeve of a connector with which the fiber optic cable is to be terminated.

In a method of preparing the fiber optic cable, once the fiber optic cable is mounted in the first member, the sheath extending from the frusto-conical end thereof is stripped off. The strength members are then folded back over the frusto-conical outer surface and the second member is employed to clamp such strength members thereon. An inner crimp sleeve is then received over the buffered cover fiber and the sleeve press means is employed to force the inner sleeve into the region between the buffered cover fiber and the strength members. In this regard, it is noted that sleeve press means is engaged by an O-ring arrangement of the second member and is of predetermined length to define the desired length of the buffered cover fiber to be received within a connector. When the entire tool is assembled, from the end of the sleeve press means, the buffer is then stripped leaving only the exposed fiber which is to be mounted at the mating end of the connector. Thereafter, the sleeve press means is removed from the combined tool arrangement and the strength fibers are cut at the point at which they are folded back. After this step the entire tool is disassembled and the cable removed therefrom resulting in a cable which has been prepared for quick and easy termination with a fiber optic connector.

BRIEF DESCRIPTION OF THE DRAWINGS

Having briefly described the invention, the same will become better understood from the following detailed discussion of the invention made with reference to the attached drawings wherein:

FIG. 3 is a side, partial cross-sectional view of two elements of the tool of the invention, shown with a cable mounted therein in condition for being finally prepared for ultimate termination with a connector; and FIG. 4 is a view as in FIG. 3 but showing still an additional element of the device of the invention shown in position for final preparation of the cable.

DETAILED DISCUSSION OF THE INVENTION

Figure 1:
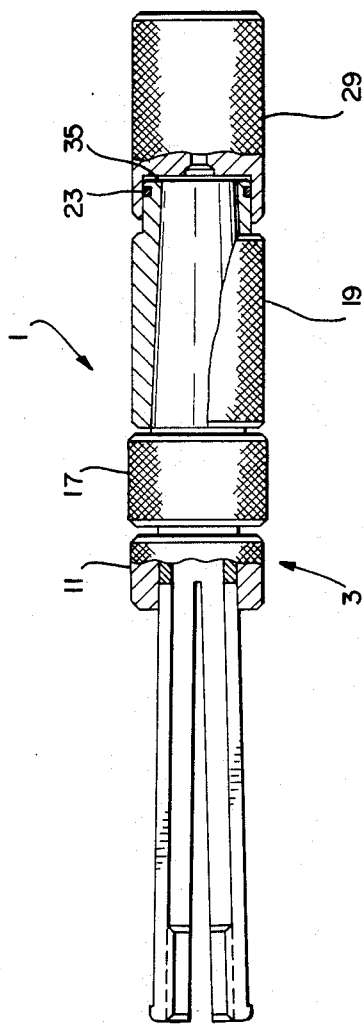
FIG. 1 is an assembled side partial cross-sectional view of the tool of the invention, shown without a fiber optic cable mounted therein.
Figure 2:
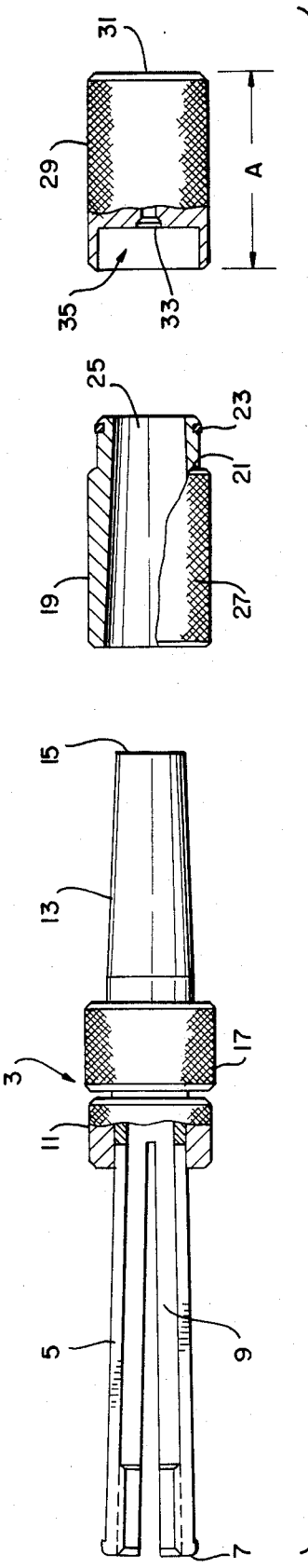
FIG. 2 is an exploded view as in FIG. 1 of the various elements of the invention.

In FIGS. 1 and 2 are shown two separate views, in assembled as well as disassembled condition, of the cable preparation tool 1 in accordance with the invention. More specifically, the cable preparation tool 1 includes a first body or member 3 which has a rear portion 5 and a front portion 13. The rear portion consists of a split section having a longitudinal passage 9 therethrough which split portion can have the various parts 7 thereof compressible together by a slidable clamp member 11. To facilitate holding of the rear body 3 by the user of the tool, a grip region 17 of conventional construction as will be readily apparent to those of ordinary skill in the art is provided. The front portion of the rear body 3 includes a frusto-conical outer surface 13 terminating at an end 15 at which the longitudinal opening 9 opens to the exterior. A second front body or member 19 is also provided having a passage 25 therethrough which corresponds is size and shape to the frusto-conical shaped front portion 13. This front body 19 includes a gripping region 27 as well as a forward extension 21 constructed for receiving an O-ring 23 thereon. The front body 19 is receivable over the front surface 13 in a manner such as to clamp strength members of a fiber optic cable between the inner walls of the passage 25 and the outer surface of the frusto-conical front portion 13.

A third body or member 29, in this case a press body member 29 includes a longitudinal passage 33 extending therethrough which is of a size sufficient to permit a buffer covered fiber to extend through the body 29 and out an opening at the front face 31 thereof. A recess 35 is of sufficient size to fit over the front end 21 of body 19 and is held thereon by means of O-ring 23. The length A of body or member 29 is such that it corresponds to a predetermined size section of fiber which is to be left covered with the buffer layer in a connector and all fiber extending beyond the front end 31 of said body 29 is to be stripped of the buffer layer for later termination within a fiber optic connector.

In use as shown in FIGS. 3 and 4, a fiber optic cable 37 having an outer sheath 39 is inserted from the rear into the rear body 3. The clamp member 11 is slid rearwardly to cause the individual split portions 7 to clamp the cable 37 therein. The front of the cable extends beyond the front end 15 of the rear body and the outer sheath 39 is cut at the very front end 15 of said front body with the strength members 41 of a cable extending therefrom. As shown clearly in FIG. 3, these strength members 41 are folded rearwardly over the frusto-conical surface 13 and the front body 19 is slid thereover to clamp said strength members 41 onto said frusto-conical surface 13. As can be seen from FIG. 3, the buffer covered fiber extends from the front. As further shown in FIG. 4, an inner sleeve 45 is then received over the buffer covered fiber 43 and moved in the direction C by means of the press body 29 which is moved in the direction B which is coincident with the direction C. This press body 29 serves to force the sleeve 45 into the region between the strength members 41 and the buffer cover fiber 43. As is clearly evident from FIG. 4, this front press body 29 is received on the front end of body 19 and held thereon so that from the front end 31 of the press body, the buffer can be stripped from the buffer covered fiber 43.

Thereafter, the front body 29 is removed and the strength fibers 41 are cut at said front end 15 of the rear body and the entire assembly is then disassembled and the cable has thus been prepared for termination, for example, with the connector of said copending application previously referenced.

Although specific materials for the device have not been elaborated on, preferably this tool is made of a metal, for example, stainless steel or other conventional material well known to those of ordinary skill in the art.

It is of course to be understood that the embodiment of the present invention herein above discussed is merely illustrative of an even wider variety of embodiments useful in practicing the invention. In all cases the scope of the invention is to be interpreted as defined by the appended claims.

What is claimed is:

1. A tool for preparing a fiber optic cable for termination with a fiber optic connector, the fiber optic cable being of the type having. in a concentric arrangement, from the exterior to the center thereof, an outer protective cover, a layer of strength members and a buffer layer covered fiber, the tool comprising:
    an elongate first member having a longitudinal passage extending therethrough, said member having one end of clampable construction and another end whose exterior surface is of frusto-conical shape, and further comprising clamp means for clamping said one end onto a fiber optical cable to be received within said longitudinal passage and held by said first member;
    second clamp member having a longitudinal passage therethrough of a size such that said second clamp member can be received on the exterior of said other end of said first member in a manner for holding strength members of a fiber optic cable securely against the outer surface of said other end; and
    sleeve press means having a longitudinal passage extending therethrough of a size sufficient to permit a buffer covered fiber of a fiber optic cable to pass therethrough, and a recess at one end of predetermined depth for receiving an inner crimp sleeve, which is mountable surrounding said buffer covered optical fiber, in a abutment against the one end of said sleeve press means a manner such that said inner crimp sleeve can be forced into said cable between said strength layer and said buffer layer to provide a support to an outer crimp sleeve of a connector with which the fiber optical cable is to be terminated.

2. A total as in claim 1 wherein said second clamp member further comprises, at the front end thereof, holding means for holding said sleeve press means on said front end thereby facilitating stripping of the buffer layer from a fiber extending therefrom.

3. A tool as in claim 2 wherein said holding means is an O-ring.

4. A tool as in claim 2 wherein said sleeve press means is of a predetermined length defined by the length of buffer covered fiber to be held within a fiber optic connector when a fiber optic cable is terminated by such a connector.

5. A tool is in claim 1 wherein said tool is made of metal.

6. A tool as in claim 5 wherein said metal is stainless steel.

7. A method of preparing a fiber optic cable of the type having in a concentric arrangement, from the exterior to the center thereof, an outer protective cover, a layer of strength members and a buffer layer cover fiber, for termination with a fiber optic connector, the method comprising using the tool of claim 1 and further comprising the steps of:
   (a) mounting said fiber optic cable within said elongate first member with a length of cable extending from the fruto-conical end thereof;
   (b) clamping said cable within said first member with said clamp means;
   (c) removing the outer protective cover from the length of cable projecting from the frusto-conical end and folding back the strength members about the frusto-conical surface;
   (d) clamping said strength members onto said frusto-conical surfce by sliding said second clamp member on the buffer covered fiber and onto said frusto-conical surface;
   (e) sliding a metal sleeve onto the buffer covered fiber and forcing it into the region between the strength members and the buffer covered fiber at a location immediately adjacent the end of the frusto-conical shaped end and within said first member, and said forcing being conducted with said sleeve press means; and
   (f) with said sleeve press means in engagement with said second clamp member, stripping the buffer off the remaining length of fiber projecting from the tool.

* * * * *